Oct. 7, 1924.                                                                1,510,527
ALEXANDER V. ROTHE
CINEMATOGRAPHIC APPARATUS
Filed Feb. 28, 1921                     3 Sheets-Sheet 1
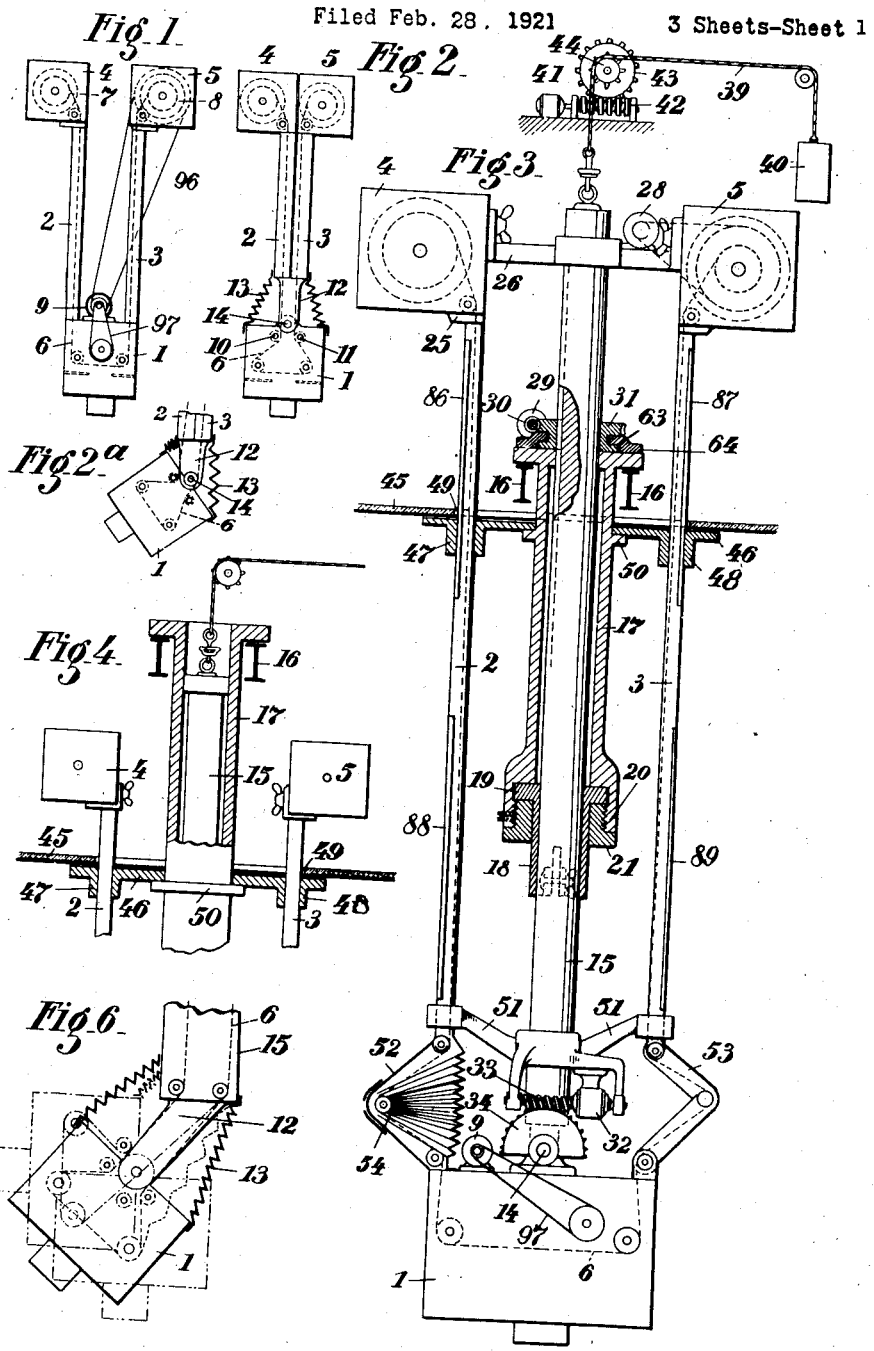
Witnesses:
L. C. Badeau
H. D. Penner
Inventor:
Alexander v. Rothe
By his Att'y F. W. Richards Oct. 7, 1924.
ALEXANDER V. ROTHE
CINEMATOGRAPHIC APPARATUS
Filed Feb. 28, 1921
1,510,527
3 Sheets-Sheet 2
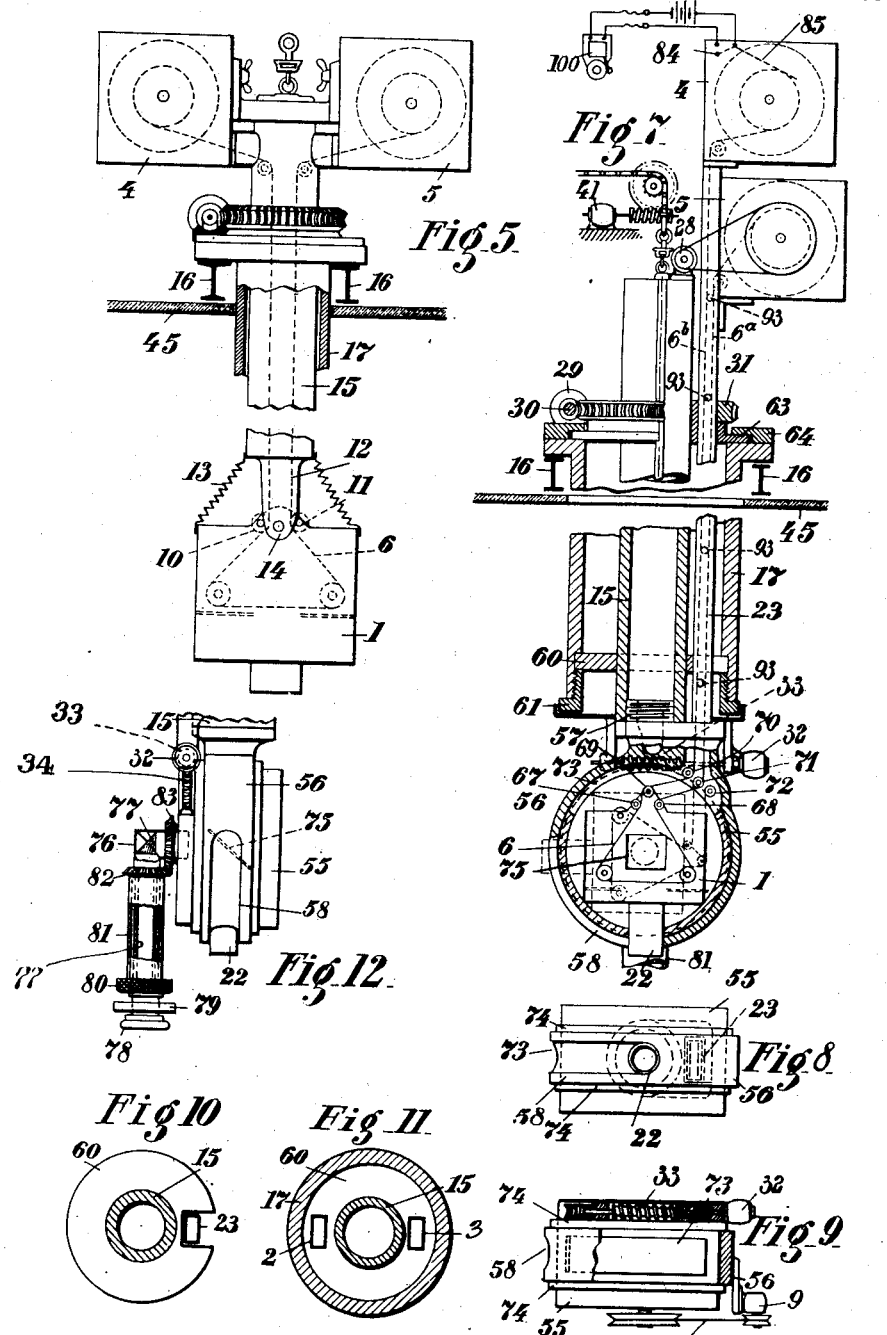
Witnesses:
L. C. Badeau
H. D. Penney
Inventor:
Alexander v. Rothe
By his Atty, F. H. Richards Oct. 7, 1924.

ALEXANDER V. ROTHE 1,510,527

CINEMATOGRAPHIC APPARATUS

Filed Feb. 28, 1921  3 Sheets-Sheet 3

Witnesses:
L. C. Badeau
H. D. Penner

Inventor:
Alexander v Rothe
By his Atty, F.H. Richards

Patented Oct. 7, 1924.

1,510,527

UNITED STATES PATENT OFFICE.

ALEXANDER v. ROTHE, OF BERLIN-WILMERSDORF, GERMANY.

CINEMATOGRAPHIC APPARATUS.

Application filed February 28, 1921. Serial No. 448,652.

(GRANTED UNDER THE PROVISIONS OF THE ACT OF MARCH 3, 1921, 41 STAT. L., 1313.)

*To all whom it may concern:*

Be it known that I, ALEXANDER V. ROTHE, a citizen of Germany, residing at Berlin-Wilmersdorf, Germany, have invented certain new and useful Improvements in Cinematographic Apparatus (for which I have filed applications in Germany, March 29, 1919; Switzerland, February 25, 1920; Luxemburg, February 26, 1920; Denmark, March 2, 1920; Sweden, March 5, 1920; Norway, March 9, 1920; Hungary, June 19, 1920; Austria, June 24, 1920; Czechoslovakia, June 25, 1920; Netherlands, June 29, 1920; Italy, June 30, 1920; Spain, July 2, 1920; France, July 6, 1920; Poland, July 6, 1920; Great Britain, July 6, 1920; Belgium, July 9, 1920; Japan, September 18, 1920), of which the following is a specification.

When taking cinematographic views at a short distance, which under certain circumstances may only amount to a few feet, one of the chief difficulties encountered resides in securing good lights for the object, in particular as the rather cumbrous apparatus is apt to throw shadows. This fact will be particularly noticed when using artificial means of lighting and when employing long films which latter render big spool boxes necessary.

In accordance with this invention the obtaining of satisfactory light is materially facilitated by the fact of the said spool boxes being distanced from the cinematographic apparatus proper, connection between the two being established by aid of special film conducting members. By these means the advantage is secured that the cinematographic apparatus proper may now obtain the smallest possible dimensions so that it will henceforth be unable to impair the lights thrown on the object to any notable degree.

The invention will be found to be of special importance when filming surgical operations, or the like, where it is of essential consequence that the surgeon carrying out the operation shall have full benefit of the light, and that moreover he and his assistants shall be embarrassed in their movements as little as possible by the presence of the apparatus. For this special purpose, which several auxiliary devices to be explained hereinafter are intended to serve, the separation of the apparatus proper from the film boxes is preferably carried to such lengths that the latter are even disposed outside of the operating-room altogether, say, for example, above the ceiling from which the apparatus is suspended. From the viewpoint of asepsis this is of course a point of great moment as by these means the dust, which will arise when the films are renewed, is kept out of the operating-room. It will further be in the interest of asepsis that touching the apparatus for the purpose of adjusting the same be avoided as far as possible. For this purpose all the motions required for the adjusting, such as the raising, inclining, shifting, may be carried out by means of a motor or motors, which may even be accomplished without requiring the operator to use his hands for the purpose of carrying out the switch operations, for which pedal switches may be provided.

Various embodiments of the subject matter of this invention are shown by way of example in the accompanying drawings, in which:

Fig. 1 is a diagrammatic view illustrating the leading principle of this present invention, Fig. 2 shows a modified form of construction in which the apparatus proper is movably arranged relatively to the guide channels and film boxes, Fig. 2ª shows the same apparatus shifted into a different position.

Fig. 3 shows a further modified form of construction, the apparatus being suspended.

Fig. 4 shows a modified manner of positioning the suspension means.

Fig. 5 shows a modified construction in which special film channels are dispensed with.

Fig. 6 shows a further modification, allowing the shifting of the optic axis of the apparatus into a horizontal position.

Fig. 7 represents a still further modification, of which

Figs. 8 to 11 show details.

Fig. 12 shows a view, partly in section, of an improved ocular structure to be used in connection with apparatus according to the invention.

Figure 15:
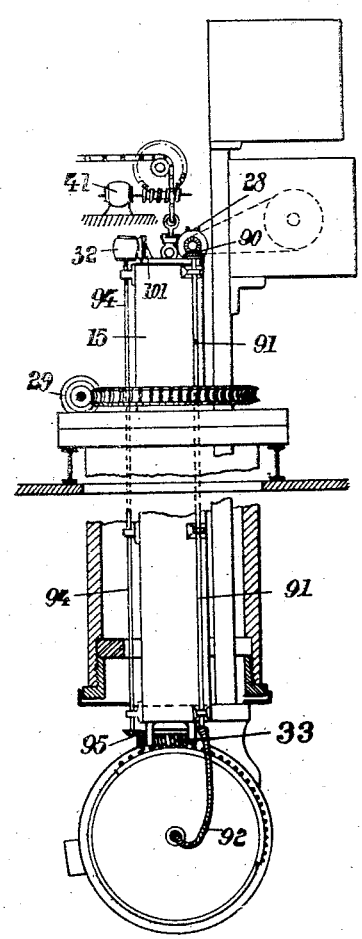
Fig. 15 shows also diagrammatically an arrangement in which all the motors are disposed outside of the operating room.

Referring to Fig. 1, the cinematographic apparatus proper 1 is connected by means of two channels 2 and 3 with the film storage box or magazine 4 and the box 5 in which the film is wound up. The film 6 runs off from the spool 7 arranged in the box 4 through the channel 2 to the apparatus 1, and thence through the channel 3 to the winding spool 8. This latter may obtain its drive by means of a rope or belt 96 from the same motor 9 serving to drive the feed gear mechanism of the apparatus by means of a rope or belt 97. The entire device may either be set up on a stand or tripod or else be hung up in any convenient manner. If the entire system be rigid then, as obvious, any adjusting motion of the apparatus 1 will be followed by the film boxes and the guide channels. In accordance with the modified form of construction shown in Fig. 2, this necessity may be obviated by the apparatus 1 being articulated to the channels 2 and 3. In this form of execution the channels are placed in direct juxtaposition, the film being transported along said channels from the apparatus by the intervention of rollers 10, 11. The channels do not extend right up to the apparatus, connection being established, on the one hand, by means of a support 12 articulated at 14 to the apparatus, on the other hand, by means of a bellows 13 to shut out the light. In Fig. 2ᵃ the apparatus is shown in a displaced position.

Subject to Fig. 3, the apparatus 1 is suspended to oscillate in a vertical plane, by a rod 15 with aid of a link member 14. The rod 15 for its part is adapted to rotate within a tube 17 suspended from girders 16. The adjustment of the apparatus to any required height is effected by means of a sleeve 18, the flange 19 of which is inserted in an enlarged extension 20 of the tube 17. At its free end the sleeve 18 is slotted so as to constitute a clamp adapted to firmly secure the suspension rod 15. The apparatus, the height of which has been adjusted in the manner described, may be oscillated about its vertical axis by the rotation of the sleeve 18 along with the rod 15 within the flange 20. In order to facilitate the raising and lowering operation, and also in order to render it impossible for the apparatus to suddenly drop on the clamp 18 loosening its hold, the weight of the apparatus and of the suspension rod 15 along with the rest of the parts connected thereto, may be suitably balanced by the provision of a counter-weight 40, merely indicated in the drawing, as of course it would have to be far larger. The raising and lowering operation may be carried out by motor means, say, for example, by aid of an electromotor 41 acting by the intervention of a worm gear 42, 43 on a guide pulley 44 of the tension member (chain) 39 running to the counter-weight 40.

The film magazine box 4 and the winding box 5 are disposed above the glass covered ceiling 45 of an operation-room. The film channels 2 and 3 are arranged to pass through guide members 47, 48 of a plate 46 adapted to close from below a circular opening 49 formed in the glass covered ceiling, said plate being disposed so as to freely rotate on an annular flange 50 of the tube 17. This arrangement affords the possibility of rotating the apparatus suspended by the rod 15, along with the channels 2, 3 and the film boxes 4, 5 mounted thereon, by the intervention of the guide members 25, around its vertical axis; and while absolutely maintaining the closure between the operating-room and the sky-light chamber. The guides 47, 48 additionally serve to strengthen the film channels to the degree required. The arms 51 arranged at the lower end of the rod 15, and which are adapted to embrace the lower extremities of the channels 2, 3, are intended to serve a like purpose.

In order to enable the apparatus to be oscillated along a perpendicular plane about the fulcrum 14, there may be arranged, as shown on the left hand side of Fig. 3, at the point of transition between apparatus 1 and the film channels a bellows 52; or else, as disclosed in same figure on the right hand side, a knee-joint 53 may be employed. Both arrangements enable the apparatus to be oscillated without causing any substantial alteration in the length of the film section disposed intermediate the film boxes and the apparatus, always providing, of course, the film be run within the bellows 52 across a guide roller 54 which, as shown is approximately disposed at the fulcrum. If it be preferred to dispense with such an arrangement, use may be made of an ordinary accordian-shaped bellows, which however would have to be prevented from shifting out sideways by the arrangement of a suitable guide, or else would have to be to such an extent secured in its position as to avoid the possibility of the film scraping.

The film boxes 4, 5 which are slid into the channelled guides 25 are screwed to supports 26 carried by the end of the rod 15 projecting upwardly out of the tube 17.

As shown in the drawing, a motor 9 mounted on the apparatus 1 serves to drive the film feed gear, while another motor 28 mounted on the support 26 is destined to drive the spool within the film storing box 5. If desired, the rotation of the apparatus about the rod 15 may be effected by means of a motor 29 with the intervention of a worm gear 30, 31. In that event the worm wheel 31 must, as shown, be connected so as to rotate with the rod 15 displaceable within it, by means of a groove and tongue arrangement. The said wheel is secured against longitudinal displacement by the fact of the flange 63 being adapted to engage a groove formed intermediate the upper front end of the tube 17 and a ring 64 fixed thereon. The pendulum motion of the apparatus about the fulcrum 14 may likewise be obtained from a motor 32 by the intervention of a worm gear arrangement 33, 34.

The film channels 2, 3 are represented as being provided with removable lids 86, 87, 88, 89 at suitable places so that they may be opened in order to remove the film dust collecting therein and also to facilitate the insertion of the film.

In the construction just described, the oscillation of the apparatus about the vertical axis is limited by the fact of the girders 16 crossing the path of the film channels 2, 3. This may be obviated in that, by making the film channels 2, 3 suitably stronger and by abandoning the connection of the film boxes with the rod 15, the tube 17 is extended in the upward direction, as shown in Fig. 4, and lodged above the uppermost position which the boxes may assume on the girders 16.

In the form of the invention shown in Fig. 5, which essentially corresponds to the arrangement according to Fig. 2, the film 6 is run upward through the suspension tube 15, in order to dispense with the arrangement of separate film channels adapted to be raised outside of tube 17. The method of suspension is that appertaining to Fig. 2, namely by means of depending arms 12, and the light being shut out by the aid of a bellows 13 connecting the end of the tube 15 with the apparatus.

In all the apparatus hitherto described, the optic axis, which in its centremost position is perpendicularly disposed, cannot be brought into a horizontal position by the oscillatory motion of the apparatus. The arrangement shown in Fig. 6 obviates this drawback by the arms 12 supporting the apparatus 1 being inclined downwards at an angle of about 45° from the tube 15, with the result that the apparatus may now be shifted by an oscillatory motion of always 45° from the inclined central position, corresponding to the direction in which the arms point, into a horizontal and perpendicular position.

Fig. 7 discloses a further modified form of the invention. In this case the feed gear of the apparatus 1 operated by the motor 9 is housed in a cylindrical casing 55, out of the bottom of which the objective 22 protrudes. The said casing is lodged in a ring 56 screwed by means of a threaded connection 57 into the lower extremity of the tube 15. This ring is provided at its circumference for the passage of the objective with a slot 58 of such peripheral extent that the cylinder 55 may be readily rotated by an angle of 90° from the vertical position thereof by the action of motor 32 and screw gear 33, 34. The film is fed forward and returned through a channel 23 disposed at one side of the tube 15, said channel being adapted to be raised and lowered conjointly with the tube 15 within the guide tube 17 under the influence of the motor 41. A circular plate 60, surrounding the tube 15 and the channel 23, is adapted to loosely engage the internal face of the tube 17, a bush 61 screwed up in front acting as its lower support. When the tube 15 with the apparatus depending thereon effects a rotation, the said circular plate 60 follows this motion. Again, when the said tube is either raised or lowered, both tube and film channel 23 slide along the plate 60, which, as will now be understood serves to secure the tube 15, in any position which it may assume, in the proper axial position. The worm wheel 31, disposed at the upper end of the tube 17, serves, as in the construction according to Fig. 3, a like purpose.

For the purpose of feeding the film 6 from the apparatus 1 into the channel 23, it is guided along on rollers 67, 68, 69 and 70, 71, 72, respectively. To keep the passage free in any position which the apparatus 1 may assume, the cylinder 55, serving to accommodate the apparatus, is provided at its periphery with a slot 73 extending for about a third of its circumference and being somewhat broader than the film. The ring 56 for its part is by so much broader than the slot 73 that there will remain a covering sufficient to reliably shut out the light. The light excluding closure may moreover be still further improved by edge strips 74 being arranged around the cylinder 55 adapted to place themselves in front of the slit remaining between the cylinder and ring.

Figure 13:
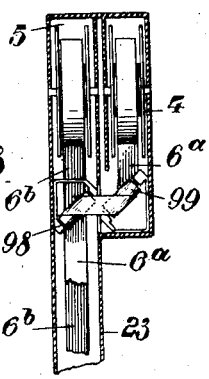
Fig. 13 shows a special arrangement of the two film boxes in connection with a common film channel.

In the construction shown, and corresponding to the employment of a single channel 23 in which the two film sections $6^a$, $6^b$ are disposed the one to the rear of the other being distanced from each other by antifriction rollers 93, the two film boxes 4 and 5 are superposed. As shown in Fig. 13, however, the boxes may also with a single film channel be juxtaposed at the same level by deflecting one of the film sections, for instance $6^a$ by means of obliquely disposed rollers 98, 99, Fig. 13. Besides, in order to render every section of the film within the channel accessible, and this independently from the other, there may be arranged, as Fig. 11 shows, separate film channels 2, 3 extending symmetrically to each other intermediate the tubes 15 and 17, so that the mutual arrangement of the film boxes will essentially be the same as that disclosed in Fig. 3.

In the drawing there is finally shown a special device adapted to enable the focusing of the picture and the sharpness thereof to be adjusted without rendering it necessary for the apparatus to be opened. In this case it is assumed that the section of the film happening to be located in front of the objective is being used as a screen. To the rear of the film there is arranged at an angle of 45° a mirror 75 (Figs. 7 and 12). Within the oppositely disposed front wall of the casing 55 there is arranged to oscillate a knee joint 76, within the angle of which there is disposed a reflecting prism 77 adapted to reflect the picture in the direction of the long limb of the joint (Fig. 12). At the end of this latter is arranged an ocular 78 through which the operator will thus be enabled to view the picture projected on to the film. By reason of the fact that the knee joint 76 is adapted to oscillate, the picture may be viewed with all convenience regardless of the height or angle to which the apparatus has been adjusted. The numeral 79 denotes a cap or closure after the manner of those used for objectives, and which is suitably kept closed by spring action as long as the hand grasping the ocular does not engage a member, not shown, serving to effect the opening. The focusing device is preferably connected to the knee joint in such manner that the rotation of a disc or hand wheel 80, disposed to the rear of the ocular, is transmitted by aid of the tube 81, of bevelled wheels 82, 83, and of other suitable intermediate members on to the adjustable portion of the apparatus. As the tube 81 is quite loosely mounted on the tube 76, as may be seen from the section in Fig. 12, it rotates very gently relatively to said tube and the toothed wheel 83. Hence the ocular may be adjusted, without this operation being impaired or disturbed when the tube is dropped into its vertical position.

In view of the long distance the film is obliged to travel, it will prove essential to interrupt the motion of the apparatus before the film has completely run off from the magazine spool, to enable the fresh film to be attached to the end of the one just run off. This operation may be effected in a simple manner by aid of an automatic electric switch 84 (Fig. 7), the action of which is made dependent upon a feeler 85 reposing on the circumference of the film spool, said dependency being such that on the feeler assuming a certain definite position, an auxiliary electric current will be closed, which in turn will cause a signalling bell 100 to ring, or else may interrupt the motor current by aid of a relay not shown. It will also prove expedient to provide automatic circuit breakers, not shown, for the adjusting motors to enable the adjusting motions to be brought to a stop when the terminal positions are reached.

Figure 14:
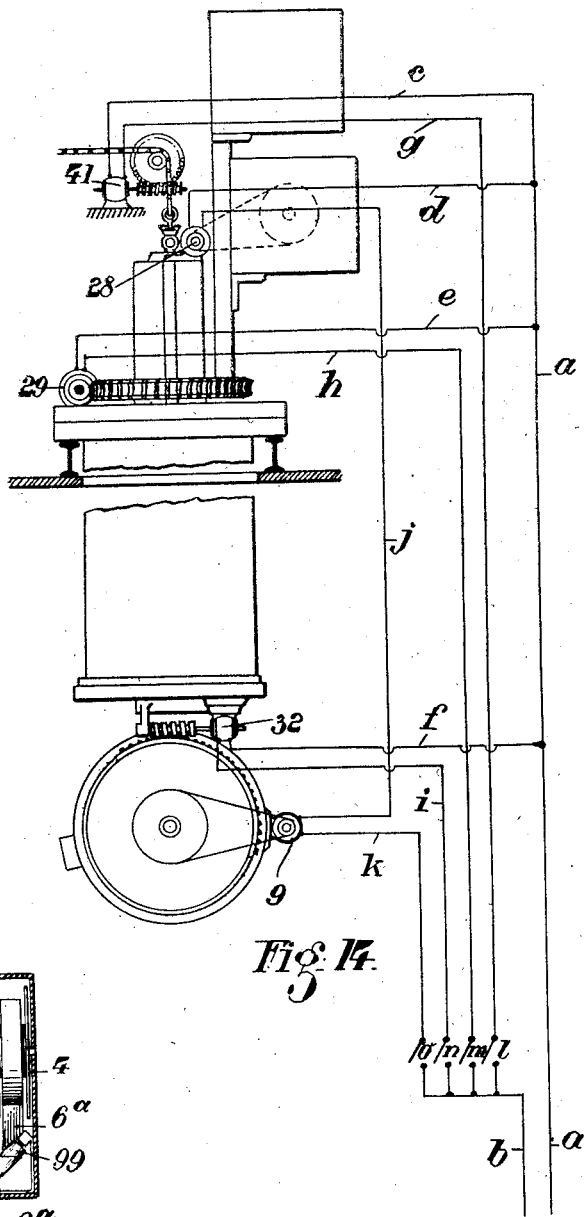
Fig. 14 shows diagrammatically the electrical connections of the different motors and their controlling means applied to the construction of Fig. 7.

In the different constructions described the switches for the various motors may be arranged at some central place, as shown in Fig. 14, preferably within reach of the feet of the operating physician so that he may thus control the apparatus without using his hands. Fig. 14 shows the connections applied to the construction of Fig. 7. $a$, $b$ are the mains. From the main $a$ branch conductors $c$, $d$, $e$, $f$ lead to the motors 41, 28, 29, 32 respectively. The motors 41, 29 and 32 are also connected by wires $g$, $h$, $i$ respectively through switches $l$, $m$, $n$ with the main $b$, so that by closing one of these switches the corresponding motor is operated. The motor 28 is connected by wire $j$ with motor 9 from which a conductor $k$ leads to a switch $o$, by means of which therefore the motors 28 and 9 which are disposed in series, are simultaneously put in and out of operation.

If it be desired to obviate the necessity of arranging the motors 9, 32 within the operating-room, then the said motors may be disposed above the ceiling 45, Fig. 7 and the respective motions of the motors be transmitted by aid of intermediate gearings. It will in such a case be found suitable to drive the feed gear by means of the motor 28, as feed gear and winding spool must always synchronize in their motions. This arrangement is shown in Fig. 15 wherein the connection of the motor 28 with the driving shaft of the feed gear is obtained by means of bevel gear 90, vertical shaft 91 and flexible shaft 92. The motor 32 is mounted at the upper end of the rod 15 by means of a support 101 and drives the worm 33 by means of vertical shaft 94 and bevel gear 95.

I claim:—

1. An apparatus for taking moving pictures, having a camera proper, a film spool box arranged outside of said camera and at a distance therefrom, light tight film conducting means connecting said box with said camera and means allowing of oscillation of said camera relatively to the film conducting means.

2. An apparatus for taking moving pictures, having a camera proper, a plurality of film spool boxes arranged outside of said camera and at a distance therefrom, light tight film conducting means connecting said boxes with said camera, and means allowing of oscillation of said camera relatively to the film conducting means.

3. An apparatus for taking moving pictures, having a camera proper, a plurality of film spool boxes arranged outside of said camera and at a distance therefrom, light tight film conducting members connecting said boxes with said camera, and means allowing of oscillation of said camera relatively to the film conducting members.

4. An apparatus for taking moving pictures, having a camera proper, a film spool box arranged outside of said camera and at a distance therefrom, light tight film conducting means connecting said box with said camera, means allowing of oscillation of said camera relatively to the film conducting means, and motor-driven means to produce said oscillation.

5. An apparatus for taking moving pictures, having a camera proper, a plurality of film spool boxes arranged outside of said camera and at a distance therefrom, light tight film conducting means connecting said boxes with said camera, means allowing of oscillation of said camera relatively to the film conducting means, and motor-driven means to produce said oscillation.

6. An apparatus for taking moving pictures, having a camera proper, a film spool box arranged outside of said camera and at a distance therefrom, a special light tight film conducting member connecting said box with said camera and means allowing of oscillation of said camera relatively to the film conducting member.

7. An apparatus for taking moving pictures, having a camera proper, a film spool box arranged outside of said camera and at a distance therefrom, a special light tight film conducting member connecting said box with said camera, means allowing of oscillation of said camera relatively to the film conducting member, and motor-driven means to produce said oscillation.

8. An apparatus for taking moving pictures, having a camera proper, a film spool box arranged outside of said camera and at a distance therefrom, a special light tight film conducting member connecting said box with said camera, a cylindrical casing enclosing said camera, a ring loosely encircling said casing and firmly connected to the film conducting member, the casing being able to oscillate within said ring.

9. An apparatus for taking moving pictures, having a camera proper, a film spool box arranged outside of said camera and at a distance therefrom, a special light tight film conducting member connecting said box with said camera, a cylindrical casing enclosing said camera, a ring loosely encircling said casing and firmly connected to the film conducting member, the casing being able to oscillate within said ring, and motor-driven means for producing said oscillating movement.

10. An apparatus for taking moving pictures, having a camera proper, a film spool box arranged at a distance from said camera, a special film conducting member connecting said box with said camera, a cylindrical casing enclosing said camera, a ring loosely encircling said casing and firmly connected to the film conducting member, the casing being able to oscillate within said ring, said ring having an aperture communicating with the film conductor and said casing having a slot being of such peripheral length as to register with the ring aperture at any position of the casing relatively to the ring.

11. An apparatus for taking moving pictures, having a camera proper, a film spool box arranged at a distance from said camera, a special film conducting member connecting said box with said camera, a cylindrical casing enclosing said camera, a ring loosely encircling said casing and firmly connected to the film conducting member, the casing being able to oscillate within said ring, said casing having an opening and the ring a peripheral slot for the passage of the objective of the camera.

12. An apparatus for taking moving pictures, having a camera proper, a film spool box arranged at a distance from said camera, a special film conducting member connecting said box with said camera, a cylindrical casing enclosing said camera, a ring loosely encircling said casing and firmly connected to the film conducting member, the casing being able to oscillate within said ring, said ring having an aperture communicating with the film conductor, a peripheral slot in said casing registering with said ring aperture, a peripheral slot in said ring for the passage of the objective of the camera protruding from said casing, said slots in the casing and ring being thus arranged relatively to each other and of such lengths that they are always out of register.

13. A device for taking moving pictures, comprising a camera proper arranged in a room and a film spool box arranged in another room, a film conductor connecting said box and camera and traversing the partition separating said rooms.

14. A device for taking moving pictures, comprising a camera proper arranged in a room and a film spool box arranged in another room, a film conductor connecting said box and camera and traversing the partition separating said rooms, the whole apparatus being rotatably mounted in the said partition.

15. A device for taking moving pictures, comprising a camera proper arranged in a room and suspended from the ceiling and a film spool box arranged outside said room above the ceiling, said box and camera being connected by a film conductor traversing the ceiling.

16. A device for taking moving pictures comprising a camera proper, a guiding tube passing through a ceiling, a suspension member for the camera guided by said tube, a film spool box arranged above the ceiling, and a film conductor passing through the ceiling and connecting said box with said camera.

17. A device for taking moving pictures comprising a camera proper, a guiding tube passing through a ceiling, a suspension member for the camera guided by said tube, a film spool box arranged above the ceiling, and a film conductor passing through said guiding tube and connecting said box with said camera.

18. A device for taking moving pictures comprising a camera proper, a guiding tube passing through a ceiling, a suspension member for the camera guided by said tube, a film spool box arranged above the ceiling, a film conductor passing through said guiding tube, a guiding disc rotatably arranged within said guiding tube and having an aperture for the passage of said film conductor.

19. A device for taking moving pictures comprising a camera proper, a guiding tube passing through a ceiling, a suspension member for the camera guided by said tube, a film spool box arranged above the ceiling, and a film conductor passing through said ceiling, said suspension member together with the camera and film conductor being rotatable within said guiding tube.

20. A device for taking moving pictures comprising a camera proper, a guiding tube passing through a ceiling, a suspension member for the camera guided by said tube, a film spool box arranged above the ceiling, and a film conductor passing through said ceiling, said suspension member together with the camera and film conductor being rotatable within said guiding tube, and motor-driven means to produce said rotation.

21. A device for taking moving pictures comprising a camera proper, a guiding tube passing through a ceiling, a suspension member for the camera guided by said tube, a film spool box arranged above the ceiling, and a film conductor passing through said ceiling, said suspension member together with the camera and film conductor being rotatable within said guiding tube, a toothed wheel connected with said suspension member for rotating movement while being axially movable thereon, and motor-driven means to rotate said toothed wheel.

22. A device for taking moving pictures comprising a camera proper, a guiding tube passing through a ceiling, a suspension member for the apparatus proper guided by said tube, a film spool box arranged above the ceiling, and a film conductor passing through said ceiling, said suspension member together with the camera and the film conductor being axially movable within said guiding tube.

23. A device for taking moving pictures comprising a camera proper, a guiding tube passing through a ceiling, a suspension member for the camera guided by said tube, a film spool box arranged above the ceiling, a film conductor passing through said ceiling, said suspension member together with the camera and the film conductor being axially movable within said guiding tube, and motor-driven means to produce said axial movement.

24. A device for taking moving pictures comprising a camera proper, a guiding tube passing through a ceiling, a suspension member for the camera guided by said tube, a film spool box arranged above the ceiling, a film conductor passing through said ceiling, said suspension member together with the camera and the film conductor being axially movable within said guiding tube, said suspension member being suspended independently of said guide tube.

25. A device for taking cinematographic views in a closed room, comprising a substantially vertical guide member traversing the ceiling of the room, a suspension rod rotatably and lengthwise movably guided in said guide member, guiding means arranged between said guide member and suspension rod, a ring fitted to the lower end of said suspension rod, a cylindrical casing for the cinematographic camera oscillatorily mounted within said ring, a film conductor traversing said guide member and communicating at its lower end with said camera, and a film spool box arranged above the ceiling of the room and above the said guide member.

26. A device for taking cinematographic views comprising a cinematographic camera, a film spool box arranged at a distance therefrom, a film conductor connecting said camera and box, the camera being oscillatorily connected to said film conductor, means for suspending said elements in such a manner as to allow their bodily lengthwise and rotary movement, motor-driven means for producing all the movements and a motor drive for the apparatus proper.

27. A device for taking cinematographic views comprising a cinematographic camera, a film spool box arranged at a distance therefrom, a film conductor connecting said camera and box, the camera being oscillatorily connected to said film conductor, means for suspending said elements in such a manner as to allow their bodily lengthwise and rotary movement, motor-driven means for producing all the movements and a motor drive for the camera, all of the switches for the different motors being mounted at a central place.

28. A cinematographic camera having an oscillatorily suspended ocular tube normally held in vertical position by its own weight and carrying an element to be acted upon by hand for focusing the picture, said element being quite loosely movable on said tube to avoid disturbing of the focusing when the tube is dropped into its vertical position.

29. An apparatus for taking moving pictures, having a camera proper, a plurality of film spool boxes arranged outside of said camera and at a distance therefrom, and film conducting means connecting said boxes with said camera.

30. An apparatus for taking moving pictures, having a camera proper, a plurality of film spool boxes arranged outside of said camera and at a distance therefrom, a common intermediate film conductor, and means arranged within said conductor to separate the different film sections from each other.

31. An apparatus for taking moving pictures, having a camera proper, a plurality of film spool boxes arranged outside of said camera and at a distance therefrom, a common intermediate film conductor, and antifriction rollers arranged within said conductor to distance the different film sections from each other.

32. In combination, a film holder; a camera arranged outside of said holder and at a sufficient distance therefrom to avoid interference by the holder with access to the view being taken and means for protecting the film between said camera and the holder.

33. In an apparatus for taking moving pictures, the combination of a film spool box; a camera proper having an exposure field for the sensitive film substantially as wide as the camera; said camera being arranged outside of said box and at a sufficient distance therefrom to avoid interference by the spool box with the view being taken; and a narrow light tight channel arranged outside of said camera and film spool box and connected thereto in a light tight manner.

34. In an apparatus for taking moving pictures, the combination of a film spool box; a camera proper, the transverse dimensions of the exposure field for the sensitive film thereof being substantially as great as the greatest transverse dimensions of the camera itself; said camera being arranged a distance from said box to avoid interference to access with the view being taken; and a light tight channel between said camera and film spool box; said combination having the new function of facilitating the taking of moving pictures of surgical operations substantially without interference with the view or the manipulations of the surgeon by the film spool box or any structure substantially projecting laterally beyond the exposure field of the film.

35. A cinematographic camera having transverse dimensions near the front end approximately no greater than the transverse dimensions of its sensitive exposure field for facilitating the taking of moving pictures of surgical operations substantially without interference with the view or the manipulations of the surgeon by any structure projecting laterally of the lens end of the camera.

36. In an apparatus for taking moving pictures, the combination of a film spool box; a camera proper having an exposure field for the sensitive film substantially as wide as the camera; said camera being arranged outside of said box and at a sufficient distance therefrom to avoid interference by the spool box with the view being taken; and a narrow light tight channel arranged outside of said camera and film spool box and connected thereto in a light tight manner; said combination having the new function of facilitating the taking of moving pictures of surgical operations substantially without interference with the view or the manipulations of the surgeon by the film spool box or other structure substantially projecting laterally beyond the exposure of the film.

In testimony whereof I affix my signature in presence of two witnesses.

ALEXANDER v. ROTHE.

Witnesses:
  KATHE LESEK,
  LEOPOLD UNGE.